US008017282B2

(12) United States Patent
Choi et al.

(10) Patent No.: US 8,017,282 B2
(45) Date of Patent: Sep. 13, 2011

(54) CARBON NANOTUBE, SUPPORT CATALYST, METHOD OF PREPARING THE SUPPORT CATALYST AND A FUEL CELL COMPRISING THE SUPPORT CATALYST

(75) Inventors: Jae-young Choi, Suwon-si (KR); Chan-ho Pak, Seoul (KR); Seok-gwang Doo, Seoul (KR); Jeong-hee Lee, Seongnam-si (KR); Young-hee Lee, Suwon-si (KR); Kay-hyeok An, Suwon-si (KR); Sung-jin Kim, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1050 days.

(21) Appl. No.: 11/897,144

(22) Filed: Aug. 28, 2007

(65) Prior Publication Data
US 2008/0182155 A1 Jul. 31, 2008

(30) Foreign Application Priority Data
Jan. 25, 2007 (KR) ........................ 10-2007-0007914

(51) Int. Cl.
  *H01M 4/36* (2006.01)
(52) U.S. Cl. ........ 429/523; 429/479; 429/484; 429/532; 977/948
(58) Field of Classification Search .................. 429/482, 429/484, 523–527, 532; 977/742, 948
See application file for complete search history.

(56) References Cited

U.S. PATENT DOCUMENTS

| 7,125,822 | B2 | 10/2006 | Nakano et al. | |
|---|---|---|---|---|
| 2002/0136681 | A1* | 9/2002 | Smalley et al. | 423/447.2 |
| 2003/0143398 | A1* | 7/2003 | Ohki et al. | 423/447.2 |
| 2004/0197638 | A1* | 10/2004 | McElrath et al. | 429/44 |
| 2005/0106094 | A1* | 5/2005 | Kondo | 423/447.2 |
| 2006/0115711 | A1 | 6/2006 | Kim et al. | |
| 2010/0255402 | A1 | 10/2010 | Heo et al. | |

FOREIGN PATENT DOCUMENTS

| JP | 2005-072015 | 3/2005 |
|---|---|---|
| KR | 10-2004-0011181 | 2/2004 |
| KR | 10-0669456 B1 | 1/2007 |
| KR | 10-0745736 B1 | 7/2007 |

OTHER PUBLICATIONS

Korean Patent Abstracts, Publication No. 1020040011181 A; Publication Date: Feb. 5, 2004; in the name of Won Bong Choi, et al.
KIPO Registration Determination Certificate dated Mar. 31, 2008, for Korean priority Patent application 10-2007-0007914, noting listed Japanese and Korean references in this IDS.

* cited by examiner

*Primary Examiner* — Raymond Alejandro
(74) *Attorney, Agent, or Firm* — Christie, Parker & Hale, LLP

(57) ABSTRACT

Carbon nanotubes have an R value of at least 1.3, where R is defined as the ratio ($I_D/I_G$) of an integral value of D band intensity ($I_D$) to an integral value of G band intensity ($I_G$) in the Raman spectrum. Such carbon nanotubes can be used to form a support catalyst with good catalyst activity because the surface defects on the carbon nanotubes promote improved catalyst distribution in that the support catalyst includes catalyst particles having a small mean particle size and a slight variation in particle size. Such a support catalyst has particularly useful properties when used as a catalyst layer for a fuel cell electrode.

6 Claims, 11 Drawing Sheets

(a) Bare : −2.53 eV (b) Stone-Wales : −2.86 eV (c) Vacancy : -6.56 eV

BARE STONE-WALES VACANCY
STRUCTURE

R value : 1.03

R value : 1.14

R value : 1.47

CARBON NANOTUBE, SUPPORT CATALYST, METHOD OF PREPARING THE SUPPORT CATALYST AND A FUEL CELL COMPRISING THE SUPPORT CATALYST

CROSS-REFERENCE TO RELATED PATENT APPLICATION

This application claims priority to and the benefit of Korean Patent Application No. 10-2007-0007914, filed on Jan. 25, 2007, in the Korean Intellectual Property Office, the entire disclosure of which is incorporated herein by reference.

BACKGROUND OF THE INVENTION

1. Field of the Invention

The present invention relates to carbon nanotubes, a support catalyst, a method of preparing the support catalyst, and a fuel cell including the support catalyst.

2. Description of the Related Art

Catalysts are used to promote electrochemical reactions in fuel cells and various attempts have been made to improve catalyst activity. The activity of catalyst tends to increase as the surface area on which the reactions occur increases. Accordingly, research on loading catalyst particles on supports such as carbon nanotubes has been conducted to increase the surface area of the catalyst. For example, see Korean Patent Publication No. 2004-0011181 which is incorporated by reference.

SUMMARY OF THE INVENTION

An embodiment of the present invention provides carbon nanotubes on which a number of catalyst particles having a small mean particle size and slight variation in particle size may be loaded.

According to an embodiment of the present invention, a carbon nanotube is provided having an R value of at least 1.3 where R is defined as the ratio ($I_D/I_G$) of the integral value of the D band intensity ($I_D$) to the integral value of the G band intensity ($I_G$) in the Raman spectrum.

According to another embodiment of the invention, a support catalyst is provided including carbon nanotubes having an R value of at least 1.3 with catalyst particles loaded on the carbon nanotubes.

According to another embodiment of the invention, a method of preparing a support catalyst is provided, the method including: (a) microwave-treating raw carbon nanotubes to generate surface defects; and (b) loading catalyst particles on the microwave-treated carbon nanotubes by heat-treating a mixture of the microwave-treated carbon nanotubes and a catalyst precursor.

According to another embodiment of the invention, a fuel cell is provided including a cathode, an anode and an electrolyte membrane between the cathode and the anode, wherein at least one of the cathode and the anode includes a catalyst layer including the improved support catalyst.

The support catalyst provides excellent catalyst activity due to improved catalyst loading of catalyst particles having a small mean particle size and slight variation in particle size.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present invention will become more apparent by describing in detail exemplary embodiments thereof with reference to the attached drawings in which.

DETAILED DESCRIPTION

Figure 1A:
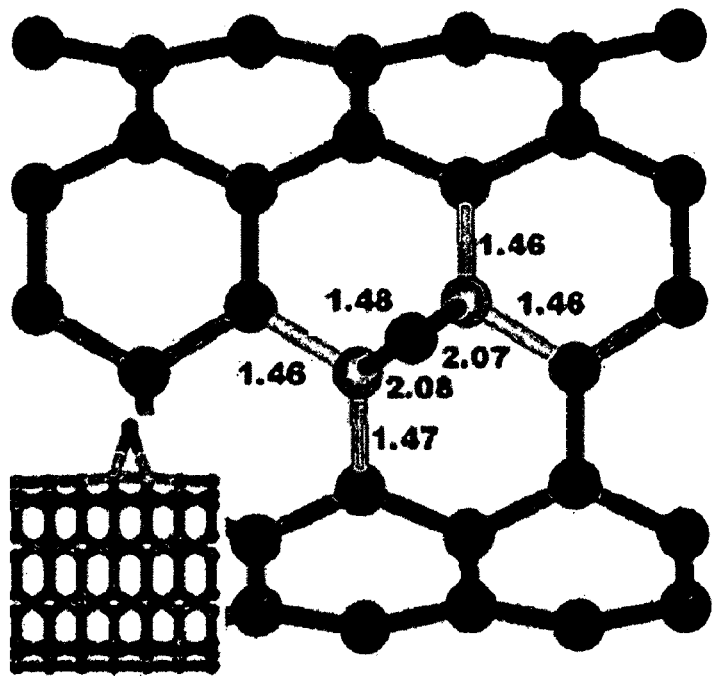
FIGS. 1A through 1C are schematic diagrams illustrating various carbon nanotube structures.

The present invention will now be described more fully with reference to the accompanying drawings, in which exemplary embodiments of the invention are shown. However, the invention may be embodied in many different forms and should not be construed as being limited to the embodiments set forth here. Rather, these embodiments are provided so that this disclosure will be thorough and complete, and will fully convey the concept of the invention to those skilled in the art.

A carbon nanotube according to the present invention has an R value of at least 1.3 where R is defined as the ratio ($I_D/I_G$) of the integral value of the D band intensity ($I_D$) to the integral value of the G band intensity ($I_G$) in the Raman spectrum. R values can be calculated by analyzing the Raman spectrum of carbon nanotubes.

The Raman spectrum can be used to analyze surface states of carbon nanotubes. A Raman peak of a carbon nanotube at around 1580 $cm^{-1}$ represents the G band intensity. The G band intensity shows $SP^2$ bonds in carbon nanotubes and indicates a highly crystalline carbon structure without defects. For example, a bare carbon nanotube structure without defects illustrated in FIG. 1A can be detected by the G band intensity.

Meanwhile, a Raman peak of a carbon nanotube at around 1360 $cm^{-1}$ represents the D band intensity. The D band shows $SP^3$ bonds in carbon nanotubes and indicates a carbon structure having surface defects. For example, FIG. 1B illustrates a stone-wales defect structure of a carbon nanotube and FIG. 1C illustrates a vacancy defect structure of a carbon nanotube. Such defect structures can be detected by the D band intensity.

The G band intensity in the Raman spectrum of the carbon nanotube according to the present invention may be a peak at $1580 \pm 80$ cm$^{-1}$ and the D band intensity may be a peak at $1360 \pm 80$ cm$^{-1}$. The wavelength range of the G band and D band may be within the range that can be varied according to a laser light source used in Raman analysis.

When the G band peak integral and D band peak integral are respectively $I_G$ and $I_D$, the R value of the carbon nanotube is $I_D/I_G$. Thus, the number of defects in the carbon nanotube increases as the R value of the carbon nanotube increases. The carbon nanotube according to the present invention has a relatively high R value of at least 1.3. Carbon nanotube having such R values can be effectively used as a support for catalyst particles. When catalyst particles for fuel cells are loaded on carbon nanotubes according to an embodiment of the present invention, the amount of catalyst particles may increase and the mean particle size of the catalyst particles may decrease. Such support catalysts may be particularly useful for the anode and cathode catalysts in fuel cells.

Without being bound by theory, it is believed that when a carbon nanotube has an R value within the range described, the defects act as sites on which catalyst particles can more effectively be attached or loaded to the carbon nanotubes to form a support catalyst. This is illustrated by FIG. 2.

Figure 1B:
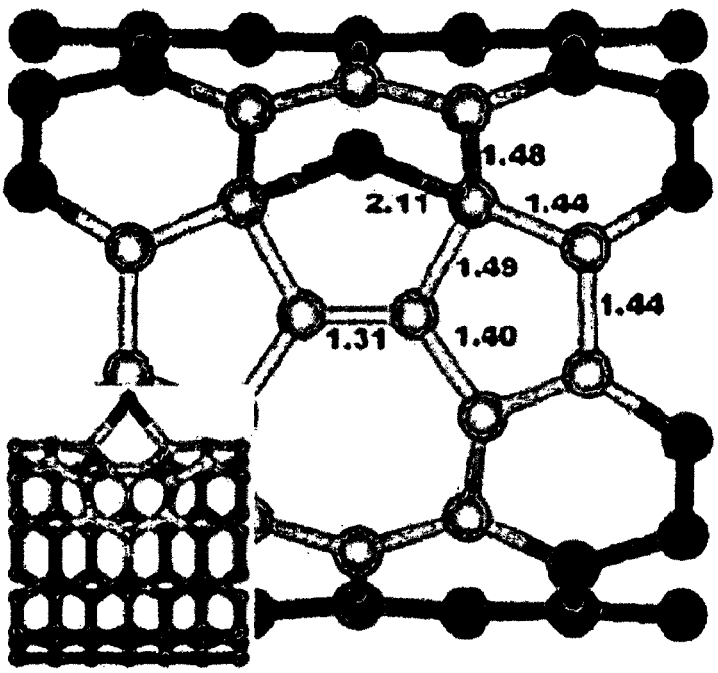
Figure 1C:
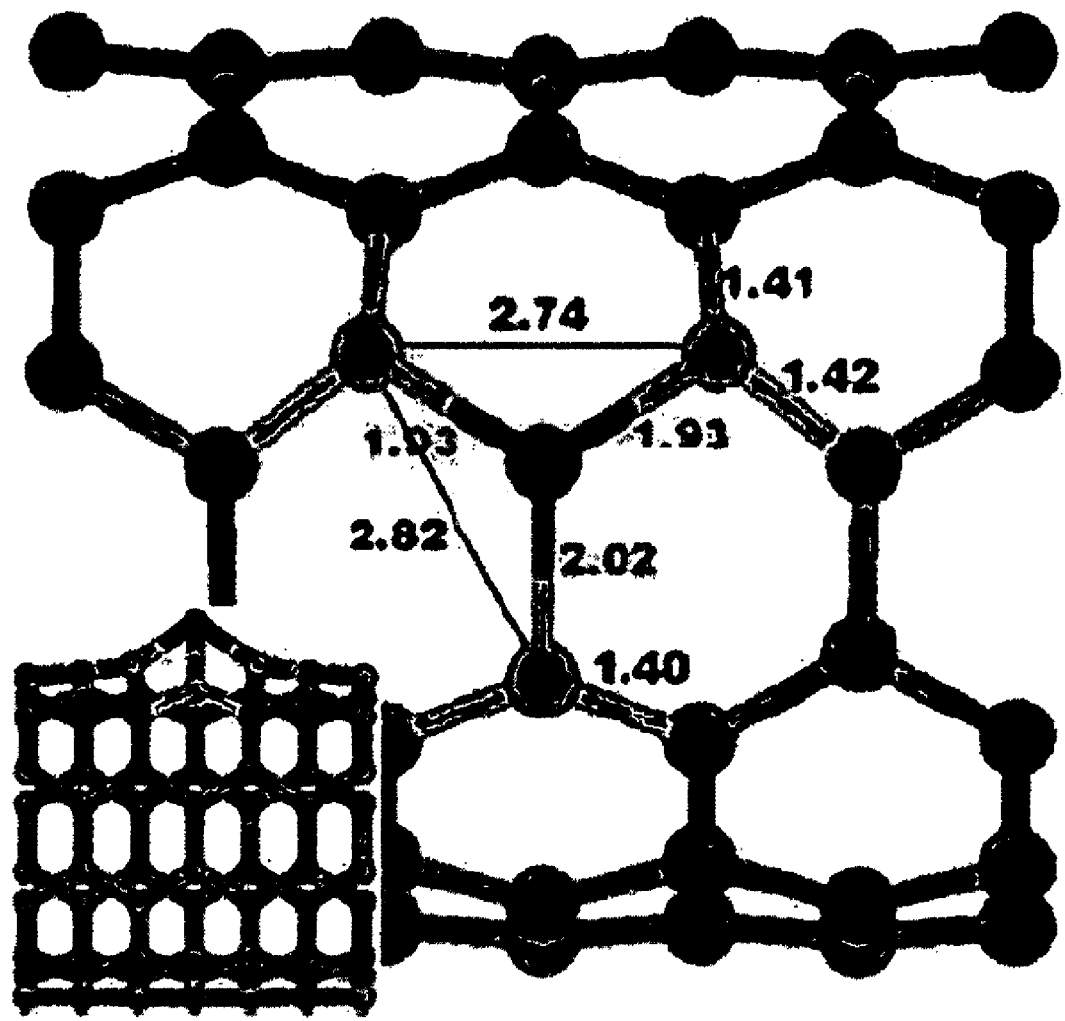
Figure 2:
FIG. 2 is a graph illustrating Pt-carbon nanotube (CNT) binding energy depending on the carbon nanotube structures illustrated in FIGS. 1A through 1C.

FIG. 2 is a graph illustrating Pt-carbon nanotube (CNT) binding energy depending on the bare structure, the stone-wales structure, and the vacancy structure of the carbon nanotubes as illustrated in FIGS. 1A through 1C, respectively. Referring to FIG. 2, bonds between Pt and the carbon nanotube are more stable in the stone-wales structure and the vacancy structure. Accordingly, an increase in the number of defects in a carbon nanotube may cause an increase in the amount of catalyst particles that may be loaded on the carbon nanotube.

One method for increasing the number of defects in a carbon nanotube is to microwave-treat the carbon nanotube. In one embodiment of the invention as will be described in further detail below, the carbon nanotube may be treated with an acid or an oxidizer before the microwave-treatment.

According to another embodiment of the invention, a support catalyst includes carbon nanotubes having an R value of at least 1.3 as defined above, with catalyst particles loaded on the carbon nanotube. The amount of the catalyst particles loaded on the carbon nanotube may be in the range of 10 to 45 wt % based on 100 wt % of the total weight of the support catalyst. Such a high amount of catalyst loading may be achieved by preparing carbon nanotubes as described above, and immersing the carbon nanotubes in a mixture including a catalyst precursor and a nonionic dispersing agent.

In an embodiment of the invention, for the support catalyst, the mean particle size of the catalyst particles loaded on the carbon nanotube may be in the range of 2 to 5 nm. Without being bound by theory, it is believed that the surface defects on the carbon nanotubes according to embodiments of the present invention act as sites where catalyst particles (or catalyst particle precursors) tend to react. It is further believed that the catalyst particles tend not to grow continuously such that the mean particle size will be within this range. When the mean particle size of the catalyst particles is within the range described above, improved catalyst activity results due to increased surface area for promoting catalytic reactions.

According to an embodiment of the invention, the variation in the particle size of the catalyst particles loaded on the carbon nanotubes may be in the range of $\pm 0.4$ to $\pm 1.1$ nm. Such a range provides a substantially uniform particle size, and agglomeration of catalyst particles is substantially inhibited. Consequently, a fuel cell employing such a support catalyst tends to exhibit excellent efficiency.

The catalyst particles loaded on the carbon nanotubes may be any catalyst particles that can be used for fuel cells. Examples of such catalyst particles include metals such as Ti, V, Cr, Mn, Fe, Co, Ni, Cu, Zn, Al, Mo, Se, Sn, Pt, Ru, Pd, W, Ir, Os, Rh, Nb, Ta, Pb, Bi, and combinations and alloys thereof, but the catalyst particles are not limited to such metals. The preferred catalyst particles may be selected depending on the specific reaction that is to occur on the support catalyst, and the specific reaction will generally depend on the type of fuel cell.

When the support catalyst of the present embodiment is used as the catalyst layer of a cathode or an anode in a phosphoric acid fuel cell (PAFC) or a polymer exchange membrane fuel cell (PEMFC,) Pt may be generally used for the catalyst particles. When the support catalyst of the present embodiment is used for the catalyst layer of an anode in a direct methanol fuel cell (DMFC,) a Pt—Ru alloy may be used for the catalyst particles. For such an embodiment, the atomic ratio of the Pt—Ru may be in the range of about 0.5:1 to about 2:1. When the support catalyst of the present embodiment is used for a catalyst layer of a cathode in a direct methanol fuel cell (DMFC,) Pt may be used as the catalyst particle.

According to another embodiment of the invention, a method for preparing a support catalyst includes: (a) microwave-treating a raw carbon nanotube to increase the surface defects; and (b) loading catalyst particles on the microwave-treated carbon nanotube by heat-treating a mixture of the microwave-treated carbon nanotube and a catalyst precursor.

The term "raw carbon nanotube" as used in this specification is intended to refer to a carbon nanotube that has not been acid-treated, oxidizer-treated, or microwave-treated. The raw carbon nanotubes may be commercially available carbon nanotubes or may be synthesized using a chemical vapor deposition, or the like.

The microwave-treatment may be performed using a commercially available microwave generating device. For example, the microwave frequency may be 2.45 GHz, but is not limited thereto. The microwave can be varied as desired depending on the types and amount of the raw carbon nanotube. According to an embodiment of the invention, the raw carbon nanotubes are sufficiently treated by the microwave-treatment to result in an R value of at least 1.3.

Then, a mixture including the microwave-treated carbon nanotube and the catalyst precursor is prepared, and the mixture is heat-treated to load the catalyst particles on the microwave-treated carbon nanotube.

Through the heat-treatment, the catalyst precursor attaches to the defects of the microwave-treated carbon nanotube where it is reduced to form catalyst particles such that catalyst particles are loaded onto the microwave-treated carbon nanotube.

According to an embodiment, the catalyst particles are loaded on the carbon nanotubes by immersing the carbon nanotubes in a mixture including a catalyst precursor, and reducing the catalyst precursor to catalyst particles through the heat-treatment. Methods for loading catalyst particles on carbon nanotubes by such immersion and reduction processes are disclosed in a number of publications, and therefore, a detailed description is not necessary.

The mixture used in loading the catalyst particles to the carbon nanotubes may further include a nonionic dispersing agent such that the mixture includes the microwave-treated carbon nanotubes, the catalyst precursor, and a nonionic dispersing agent. The nonionic dispersing agent surrounds the surface of the catalyst particles that are attached to the carbon nanotube to prevent a dramatic increase in particle size of the catalyst particles and to prevent agglomeration of the catalyst particles. Thus, the nonionic dispersing agent can decrease the absolute value of the mean particle size and the variation in particle size of the catalyst particles.

The resulting support catalyst may then be washed with water and/or acetone.

A support catalyst prepared using this method may include carbon nanotubes having an R value of at least 1.3 as defined above, with catalyst particles loaded on the surface defects of the carbon nanotubes.

Figure 3:
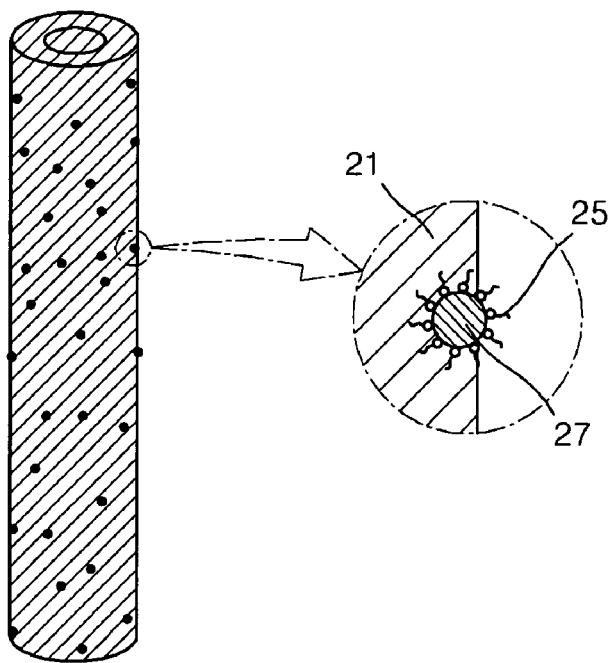
FIG. 3 is a schematic diagram of a support catalyst in which a dispersing agent is attached to catalyst particles according to a method of preparing a support catalyst according to an embodiment of the present invention.

FIG. 3 is a schematic diagram of a support catalyst illustrating the use of a nonionic dispersing agent 25 to assist in attaching the catalyst particles 27 to a surface of a microwave-treated carbon nanotube 21. The nonionic dispersing agent 25 surrounds the surface of the catalyst particles 27, and in doing so, prevents the catalyst particles 27 from agglomerating and from growing too large such that the absolute value of the mean particle size and the variation in particle size of the catalyst particles 27 may decrease. According to an embodiment, the mean particle size and the variation in particle size of the catalyst particles 27 may be within the range described above.

Nonlimiting examples of the nonionic dispersing agent include poly vinyl pyrolidone (PVP), poly acrylonitrile, poly oxyethylene, poly ethylene, poly propylene, poly vinyl chloride, poly methyl methacrylate, poly acrylamide, poly styrene, poly 12-hydroxy stearic acid, poly dimethyl siloxane, poly isobutylene, cis-1,4-poly isoprene, poly vinyl acetate, polyvinyl methyl ether, and combinations and copolymers thereof.

When the mixture used in loading the catalyst particles includes a nonionic dispersing agent, the nonionic dispersing agent 25 tends to remain on the surface of the catalyst particles 27 as illustrated in FIG. 3. Therefore, according to an embodiment of the invention, the method may further include: (c) removing the remaining nonionic dispersing agent. One method for removing the remaining nonionic dispersing agent is to heat-treat the carbon nanotubes on which the catalyst particles have been loaded. Removal of the remaining nonionic particles tends to prevent deterioration of the microwave-treated carbon nanotube.

According to an embodiment, the heat-treatment may be performed at a temperature in the range of about 300 to 600° C. in an inert gas atmosphere or in a vacuum for from 30 minutes to 2 hours. Suitable inert gases include argon and nitrogen. Suitable vacuum conditions are from $10^{-7}$ to $10^{-2}$ torr. However, the conditions can be varied according to the types of the carbon nanotubes and the types of the dispersing agent.

According to one embodiment, operations (a) and (b) may be performed simultaneously. That is, a mixture including raw carbon nanotubes and a catalyst precursor is prepared and the mixture is simultaneously heat-treated and microwave-treated. Still other various applications are possible.

In still another embodiment, the mixture used in operation (b) may further include a vehicle such as water, acetone, methanol, ethanol, isopropylalcohol, n-propylalcohol, butanol, dimethylacetamide, dimethylformamide, dimethyl-sulfoxide, N-methyl-2-pyrrolidone, tetrahydrofuran, tetrabutylacetate, n-butylacetate, m-cresol, toluene, ethylene glycol (EG), gamma-butyrolactone, or hexafluoroisopropanol (HFIP) and/or a pH regulator such as KOH, NaOH, $NH_4OH$, and HCl.

According to an embodiment, the raw carbon nanotube may further be treated with an acid or an oxidizer before the microwave-treatment in operation (a). Thus, the number of defects of the carbon nanotubes may increase to obtain carbon nanotubes having an increased R value.

Nonlimiting examples of suitable acids include $HNO_2$, $H_2SO_4$, HCl and the like, and nonlimiting examples of the oxidizer include $NaClO_3$, $KClO_3$, $Mg(ClO_3)_2$, $Ca(ClO)_2$, $C_2H_5ClO$, $H_2O_2$ and the like, but the acid and oxidizer are not so limited.

Figure 16:
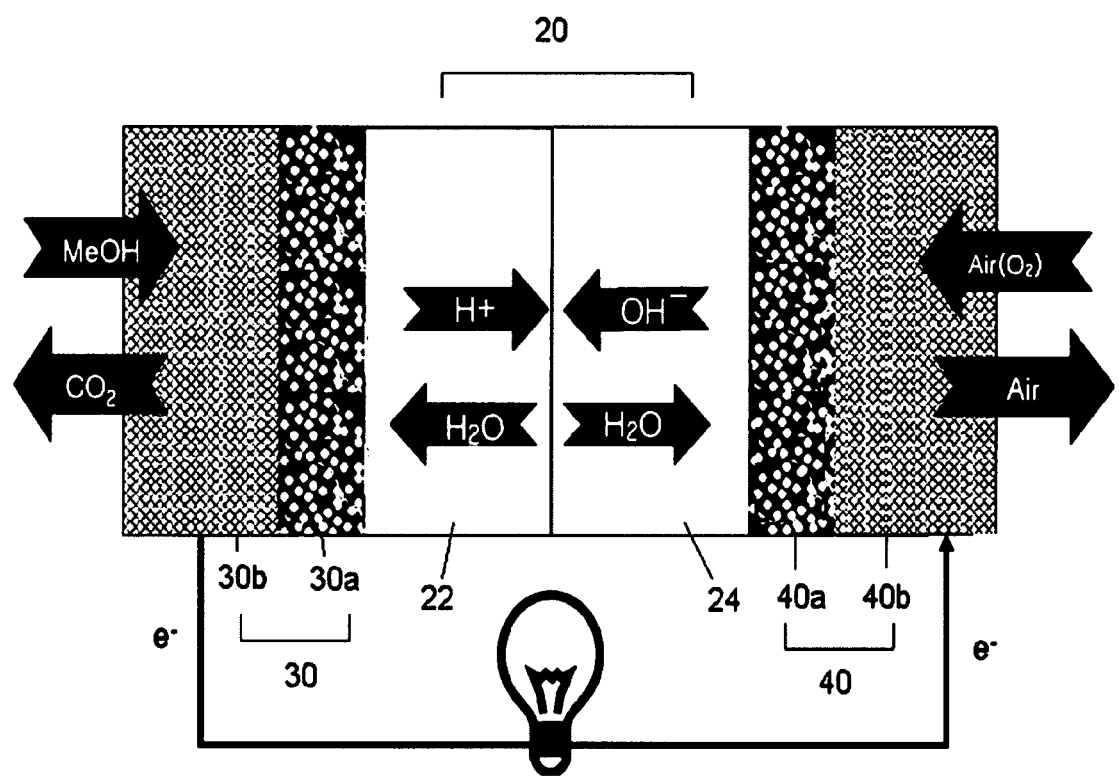
FIG. 16 is a schematic diagram illustrating a direct methanol fuel cell including an improved support catalyst.

A direct methanol fuel cell (DMFC) will now be described in detail with reference to FIG. 16. The fuel cell includes an anode 30, and a cathode 40 separated by a polymer electrolyte membrane 20. Methanol is supplied to an anode catalyst layer 30a of the anode 30 through the anode substrate 30b. At the catalyst layer 30a, the methanol is oxidized to generate protons, electrons, and carbon dioxide. The protons are transferred through the cation conductive layer 22 of the polymer electrolyte membrane 20, the electrons are transferred to the cathode 40 via an out-circuit, and the carbon dioxide is discharged to atmosphere. Oxygen is supplied to a cathode catalyst layer 40a of the cathode 40 via the cathode substrate 40b where it reacts with protons and electrons to generate hydroxyl ions. The hydroxyl ions are transferred through the anion conductive layer 24, and react with protons transferred through the cation conductive layer 22 to generate water. One or both of the anode catalyst layer 30a and the cathode catalyst layer 40a includes a support catalyst as described above.

While the fuel cell described is a DMFC, in other embodiments, the support catalyst may be used for other types of fuel cells including phosphoric acid fuel cells (PAFCs) or hydrogen fuel cells (also called proton exchange membrane fuel cells or PEMFCs.) The detailed structures of fuel cells and the methods of preparing such fuel cells are well known to one of ordinary skill in the art, and will not be described further.

Specific embodiments of the invention will now be described with reference to the following examples. However, the examples are for illustrative purposes and are not intended to limit the scope of the invention.

Example 1

Preparation of Sample 1

A) Measuring Raman Spectrum of a Raw Carbon Nanotube

Figure 4:
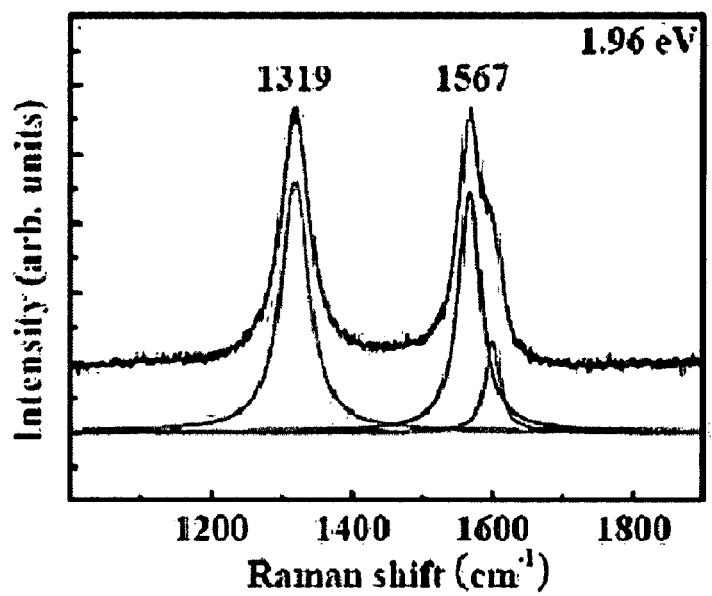
FIG. 4 is a graph illustrating the Raman spectrum of a raw carbon nanotube.

The Raman spectrum of a multi-walled carbon nanotube (Iljin Co.,) as a raw carbon nanotube was measured. The Raman spectrum was measured through Raman spectroscopy (Ranishaw RM1000-InVia) using a laser light having a wavelength of 632.8 nm with a spot size of 10 μm under a power of 17.65 mW under an air atmosphere at room temperature. The Raman spectrum is shown in FIG. 4 where the R value of the raw carbon nanotube is calculated to be 1.03.

B) Preparation of an Acid-Treated Carbon Nanotube

A 1 g sample of raw carbon nanotubes was prepared and introduced into a mixture of 70 wt % of $HNO_3$ and 95 wt % $H_2SO_4$ mixed in a volume ratio of 1:3, and the mixture was sonicated and stirred for 24 hours. The resulting product was filtered through a filter having a pore size of 1 μm, and dried in an oven at 100° C. for 12 hours to prepare acid-treated carbon nanotubes.

Figure 5:
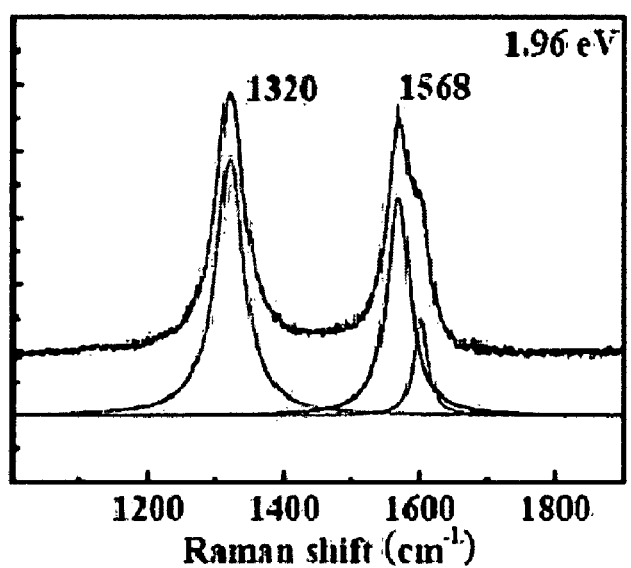
FIG. 5 is a graph illustrating the Raman spectrum of an acid-treated carbon nanotube according to Example 1.

The Raman spectrum of the acid-treated carbon nanotubes was measured using the method described above and the results are shown in FIG. 5 where the R value of the acid-treated carbon nanotubes was calculated to be 1.14.

C) Loading Pt Particles

Figure 6:
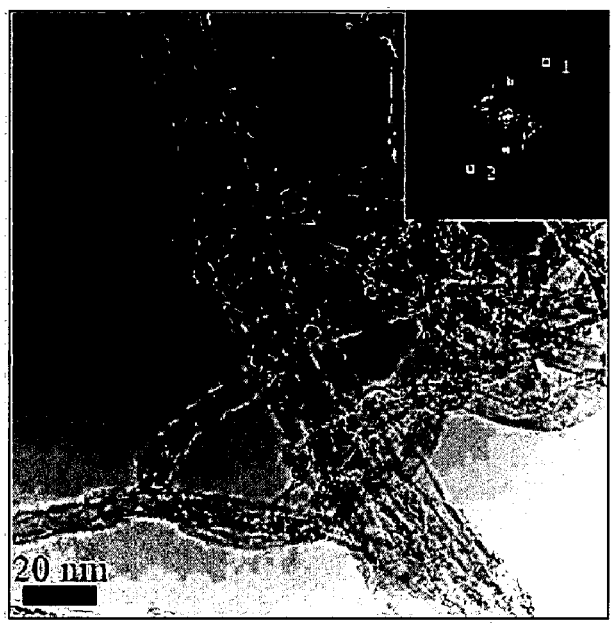
FIG. 6 is a transmission electron microscope (TEM) image of Sample 1 of Example 1.

Sample 1 was prepared by immersing 40 mg of the acid-treated carbon nanotubes in a mixture of 25 ml of ethylene glycol, 4 ml of $H_2PtCl_6$ and from 0.5 to 1.5 ml of KOH, and the mixture was heated to its boiling point and maintained for 30 minutes to reduce a Pt salt loaded on the acid-treated carbon nanotubes to Pt particles. The resulting product was cooled, filtered through a filter having a pore size of 1 μm, and dried in an oven at 100° C. for 12 hours to prepare carbon nanotubes loaded with Pt. The mean particle size of Pt loaded on Sample 1 was 3.3 nm, and the variation in particle size of Pt was ±1.0 nm (obtained by a X-ray microanalysis using Powder XRD(D8 FOCUS, BRUKER AXS at 2.2 Kw, anode source unit: Cu, 40 kV, start: 5.0, 2 theta: 5.0/min, room temperature, Λ: 1.54056 Å.) This same procedure was used in determining the mean particle size and the variation in particle size of the catalyst particles loaded on the carbon nanotubes for the other samples discussed here. The loaded amount of the Pt particles was 5 wt % (obtained by thermogravimetric analysis (TGA Q50Q), in an atmosphere including $Ar/O_2$ in a ratio of 20/80 at 5° C./min to 900° C., wherein flow rate in a balance was 20 sccm, and flow rate was 80 sccm when a sample is burned.) This same procedure was used in determining the loaded amount of catalyst for the other samples discussed here. A TEM image of Sample 1 (using JEOL JEM 2100F, at accelerating voltage of 80 to 200 kV) is shown in FIG. 6.

Example 2

Preparation of Sample 2

A) Preparation of an Oxidizer-Treated Carbon Nanotube

A sample of 0.1 g of the raw carbon nanotubes used in Example 1, 200 ml of $HNO_3$ and 250 ml of 0.2M $NaClO_3$ as an oxidizer were placed in a vial, and the mixture was stirred at 60° C. for 12 hours. The resulting product was filtered through a filter having a pore size of 1 μm, and dried in an oven at 100° C. for 12 hours to obtain oxidizer-treated carbon nanotubes.

The Raman spectrum of the oxidizer-treated carbon nanotubes was measured in the same manner as in Example 1, and the R value was 1.21.

B) Loading Pt Particles

For Sample 2, Pt particles were loaded on the oxidizer-treated carbon nanotubes in the same manner as in operation C) of Example 1, except that the oxidizer-treated carbon nanotubes were used instead of the acid-treated carbon nanotubes. The mean particle size of Pt loaded on Sample 2 was 3.7 nm, the variation in particle size of Pt was ±1.1 nm, and the loading amount of the Pt particles was 7 wt %.

Example 3

Preparation of Sample 3

A) Preparation of a Microwave-Treated Carbon Nanotube

A sample of 40 mg of the raw carbon nanotubes used in Example 1 and 25 ml of ethylene glycol were mixed, and the mixture was microwave-treated. The microwave-treatment was performed in a microwave oven that operates at a power of 700 W at a frequency of 2.45 GHz. The microwave-treatment was performed for 6 minutes in total by repeating six times the process of turning the microwave oven on for one minute and off for 2 minutes. The resulting product was filtered through a filter having a pore size of 1 μm, and dried in an oven at 100° C. for 12 hours to obtain microwave-treated carbon nanotubes.

The Raman spectrum of the oxidizer-treated carbon nanotubes was measured in the same manner in Example 1, and the R value was 1.31.

B) Loading Pt Particles

Figure 7:
FIG. 7 is a TEM image of Sample 3 of Example 3.

For Sample 3, Pt particles were loaded on the microwave-treated carbon nanotubes in the same manner as in operation C) of Example 1, except that the microwave-treated carbon nanotubes were used instead of the acid-treated carbon nanotubes. The mean particle size of Pt loaded on Sample 3 was 4.1 nm, the variation in particle size of Pt was ±1.0 nm, and the loading amount of the Pt particles was 10 wt %. A TEM image of Sample 3 was shown in FIG. 7.

Example 4

Preparation of Sample 4

A) Preparation of an Oxidizer-Treated and Microwave-Treated Carbon Nanotube

Figure 8:
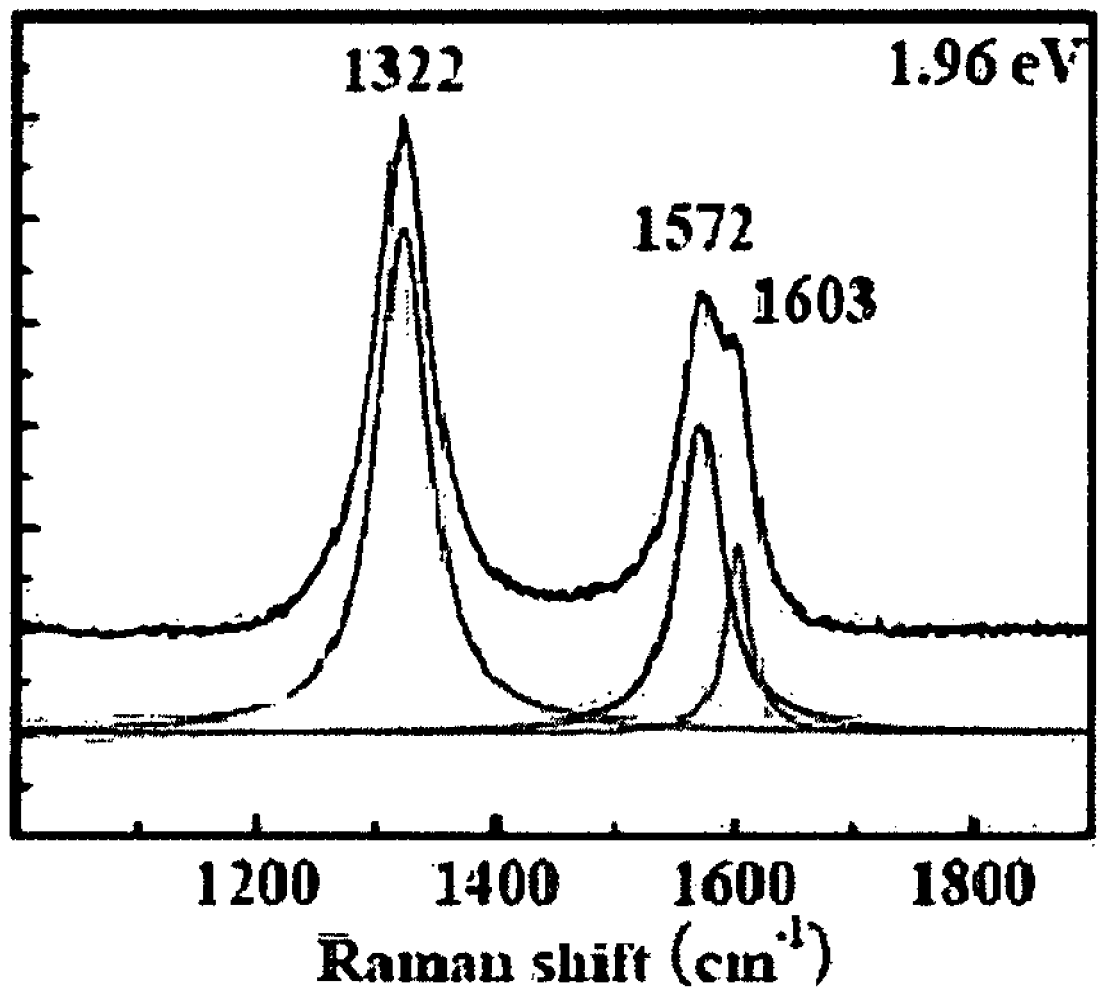
FIG. 8 is a graph illustrating the Raman spectrum of an oxidizer-treated and microwave-treated carbon nanotube according to Example 4.

Oxidizer-treated and microwave-treated carbon nanotubes were prepared by treating the carbon nanotubes obtained from operation A) of Example 2 in the same manner as in operation A) of Example 3. The Raman spectrum of the oxidizer-treated and microwave-treated carbon nanotubes was measured in the same manner as in Example 1, and the results are shown in FIG. 8. Referring to FIG. 8, the R value of the oxidizer-treated and microwave-treated carbon nanotubes was 1.47.

B) Loading Pt Particles

For Sample 4, Pt particles were loaded on the oxidizer-treated and microwave-treated carbon nanotubes in the same manner as in operation C) of Example 1, except that the oxidizer-treated and microwave-treated carbon nanotubes were used instead of the acid-treated carbon nanotubes. The mean particle size of Pt loaded on Sample 4 was 2.7 nm, the variation in particle size of Pt was ±0.6 nm, and the loading amount of the Pt particles was 17 wt %.

Example 5

Preparation of Sample 5

A) Preparation of an Acid-Treated and Microwave-Treated Carbon Nanotube

Acid-treated and microwave-treated carbon nanotubes were prepared by treating the carbon nanotubes obtained in operation A) of Example 1 in the same manner as in operation A) of Example 3. The Raman spectrum of the acid-treated and microwave-treated carbon nanotubes was measured in the same manner as in Example 1, and the R value was 1.34.

B) Loading Pt Particles

Figure 9:
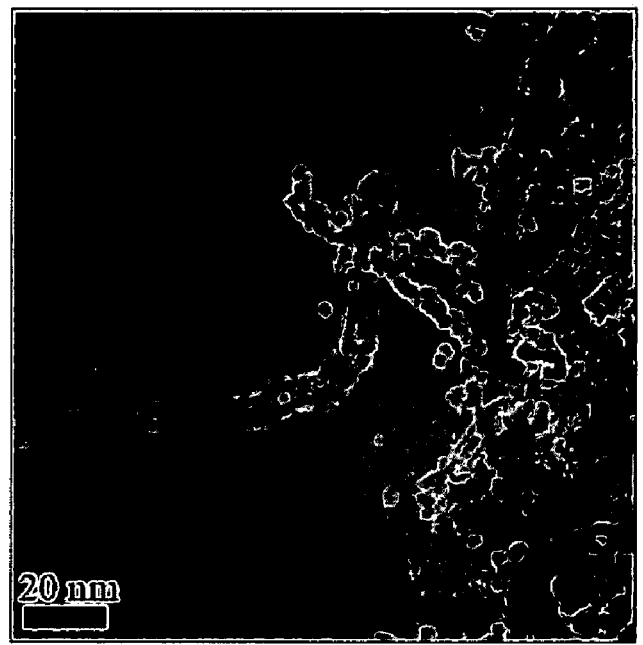
FIG. 9 is a TEM image of Sample 5 of Example 5.

For Sample 5, Pt particles were loaded on the acid-treated and microwave-treated carbon nanotubes in the same manner as in operation C) of Example 1, except that the acid-treated and microwave-treated carbon nanotubes were used instead of the acid-treated carbon nanotubes. The mean particle size of Pt loaded on Sample 5 was 3.0 nm, the variation in particle size of Pt was ±0.6 nm, and the loading amount of the Pt particles was 14 wt %. A TEM image of Sample 5 is shown in FIG. 9.

Example 6

Preparation of Sample 6

A) Loading Pt Particles

A sample of 40 mg of the microwave-treated carbon nanotubes prepared in operation A) of Example 3 was immersed in a mixture including 25 ml of ethylene glycol, 0.4 g of PVP, 4 ml of $H_2PtCl_6$ and 0.5 to 1.5 ml of KOH, and the mixture was heated to its boiling point and maintained for 30 minutes to reduce a Pt salt loaded on the microwave-treated carbon nanotubes to Pt. The resulting product was cooled, filtered through a filter having a pore size of 1 μm, and dried in an oven at 100° C. for 12 hours to prepare carbon nanotubes loaded with Pt.

B) Heat-Treatment for Removing PVP

Figure 10:
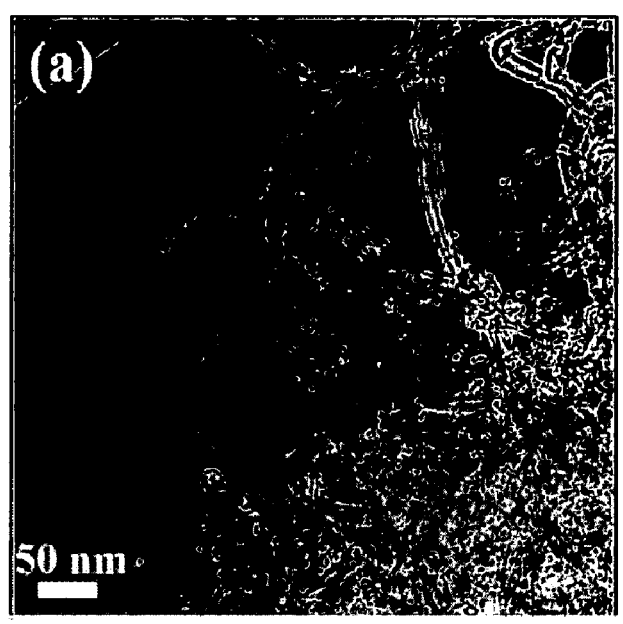
FIG. 10 is a TEM image of Sample 6 of Example 6.

The resulting product obtained in operation A) was placed in a furnace and the furnace was heated to 600° C., and heat-treated for 1 hour in a vacuum ($10^{-6}$ torr) to produce Sample 6. The mean particle size of Pt loaded on Sample 6 was 1.7 nm, the variation in particle size of Pt was ±0.4 nm, and the loading amount of the Pt particles was 10 wt %. A TEM image of Sample 6 is shown in FIG. 10.

Example 7

Preparation of Sample 7

A) Loading Pt Particles

Figure 11A:
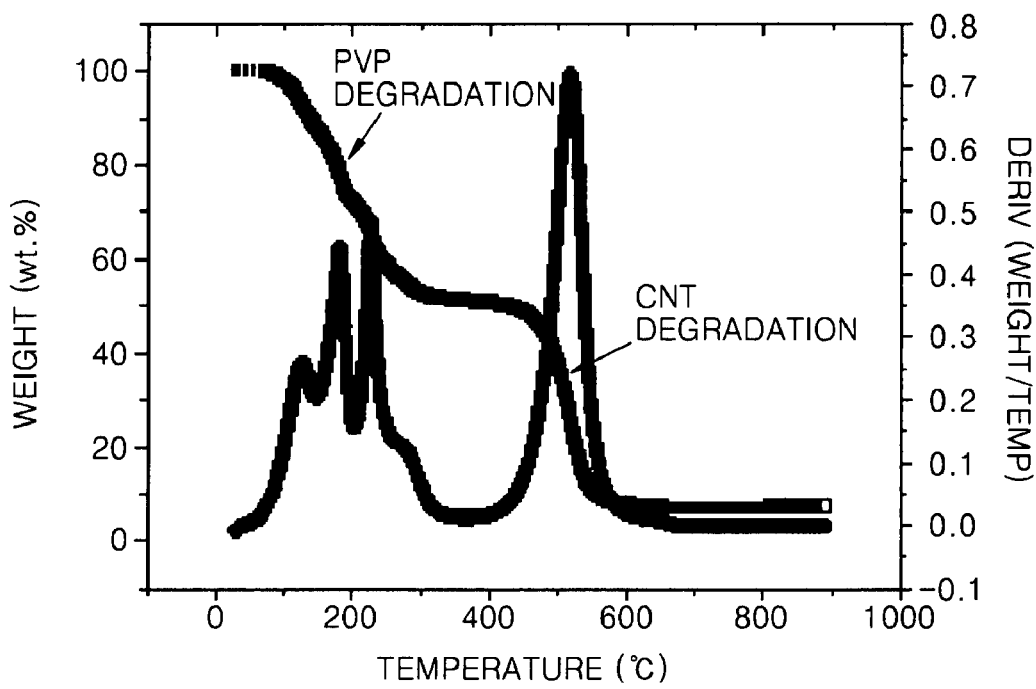
FIGS. 11A and 11B are graphs illustrating thermal decomposition properties of a carbon nanotube before and after heat-treatment for removing a dispersing agent according to Example 7.

Carbon nanotubes loaded with Pt were prepared in the same manner as in operation A) of Example 6, except that the oxidizer-treated and microwave-treated carbon nanotubes prepared in operation A) of Example 4 were used instead of the microwave-treated carbon nanotubes. A part of the resulting product was analyzed using TG analysis (TGA Q50Q, in an atmosphere including $Ar/O_2$ in a ratio of 20/80 at 5° C./min to 900° C., wherein flow rate in a balance was 20 sccm, and flow rate was 80 sccm when a sample is burned), and the results are shown in FIG. 11A. Referring to FIG. 11A, the presence of PVP was identified.

B) Heat-Treatment for Removing PVP

Figure 11B:
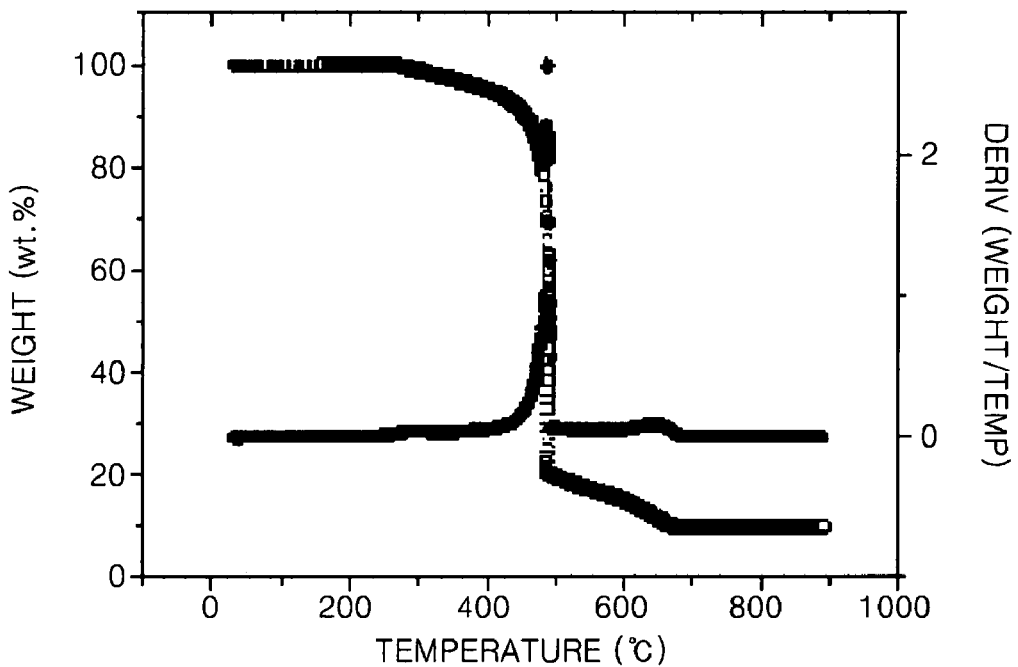
Figure 12:
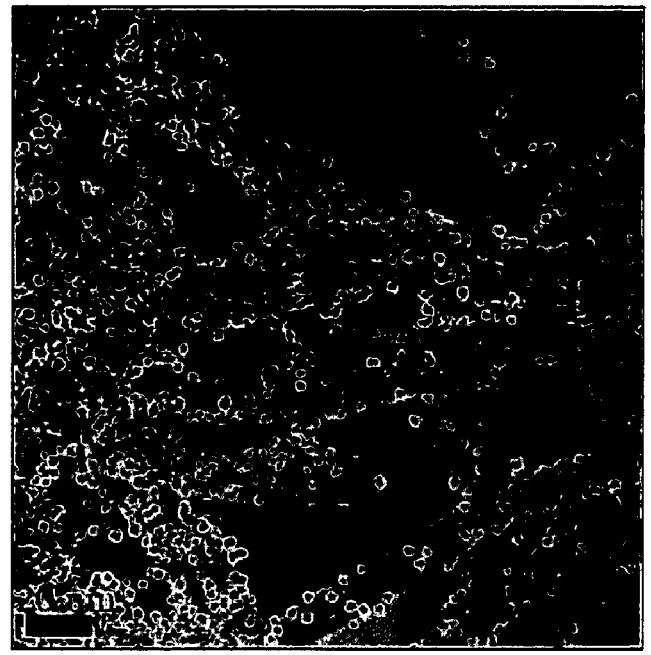
FIG. 12 is a TEM image of Sample 7 of Example 7.

The resulting product obtained in operation A) was treated in the same manner as in operation B) of Example 6 to produce Sample 7. A part of Sample 7 was analyzed using TG analysis in the same manner as in operation A), and the results are shown in FIG. 11B. Referring to FIG. 11B, the PVP was removed since the weight was not changed while the temperature increased to about 300° C. The mean particle size of Pt loaded on Sample 7 was 2.1 nm, the variation in particle size of Pt was ±0.5 nm, and the loading amount of the Pt particles was 45 wt %. A TEM image of Sample 7 is shown in FIG. 12.

Example 8

Preparation of Sample 8

For Sample 8, carbon nanotubes loaded with Pt were prepared in the same manner as in Example 7, except that the microwave-treatment was performed for 2 minutes instead of 6 minutes while the oxidizer-treated and microwave-treated carbon nanotubes were prepared. The R value of the carbon nanotubes or Sample 8 was 1.24. The mean particle size of Pt loaded on Sample 8 was 2.2 nm, the variation in particle size of Pt was ±0.6 nm, and the loading amount of the Pt particles was 27 wt %.

Example 9

Preparation of Sample 9

Figure 13:
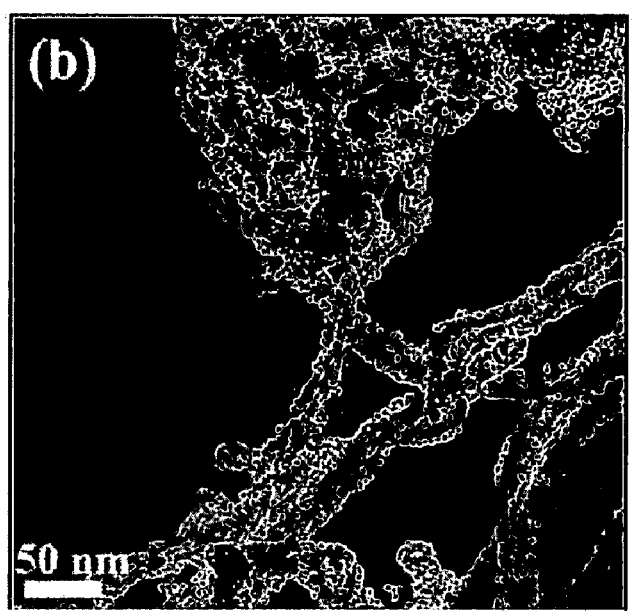
FIG. 13 is a TEM image of Sample 9 of Example 9.

For Sample 9, carbon nanotubes loaded with Pt were prepared in the same manner as in Example 7, except that the microwave-treatment was performed for 4 minutes instead of 6 minutes while the oxidizer-treated and microwave-treated carbon nanotubes were prepared. The R value of the carbon nanotubes of Sample 9 was 1.21. The mean particle size of Pt loaded on Sample 9 was 2.0 nm, the variation in particle size of Pt was ±0.4 nm, and the loading amount of the Pt particles was 32 wt %. A TEM image of Sample 9 is shown in FIG. 13.

Example 10

Preparation of Sample 10

For Sample 10, carbon nanotubes loaded with Pt were prepared in the same manner as in Example 7, except that the microwave-treatment was performed for 8 minutes instead of 6 minutes while the oxidizer-treated and microwave-treated carbon nanotubes were prepared. The R value of the carbon nanotubes of Sample 10 was 1.30. The mean particle size of Pt loaded on Sample 10 was 2.2 nm, the variation in particle size of Pt was ±0.7 nm, and the loading amount of the Pt particles was 40 wt %.

Example 11

Preparation of Sample 11

For Sample 11, carbon nanotubes loaded with Pt were prepared in the same manner as in Example 7, except that the microwave-treatment was performed for 10 minutes instead of 6 minutes while the oxidizer-treated and microwave-treated carbon nanotubes were prepared. The R value of the carbon nanotubes of Sample 11 was 1.23. The mean particle size of Pt loaded on Sample 11 was 4.5 nm, the variation in particle size of Pt was ±1.1 nm, and the loading amount of the Pt particles was 11 wt %.

The characteristics of Samples 1 to 11 are summarized in Table 1.

TABLE 1

| Sample No. | Acid-treatment | Oxidizer-treatment | Microwave-treatment | Microwave-treatment time | Use of PVP | Mean particle size of loaded Pt particles (nm) | Variation in particle size of loaded Pt particles (nm) | Loading amount of Pt particles (wt %) | R |
|---|---|---|---|---|---|---|---|---|---|
| 1 | ○ | | | | — | 3.3 | ±1.0 | 5 | 1.14 |
| 2 | | ○ | | | — | 3.7 | ±1.1 | 7 | 1.21 |
| 3 | | | ○ | 6 min | — | 4.1 | ±1.0 | 10 | 1.31 |
| 4 | | ○ | ○ | 6 min | — | 2.7 | ±0.6 | 17 | 1.47 |
| 5 | ○ | | ○ | 6 min | — | 3.0 | ±0.6 | 14 | 1.34 |
| 6 | | | ○ | 6 min | ○ | 1.7 | ±0.4 | 10 | 1.31 |

TABLE 1-continued

| Sample No. | Acid-treatment | Oxidizer-treatment | Microwave-treatment | Microwave-treatment time | Use of PVP | Mean particle size of loaded Pt particles (nm) | Variation in particle size of loaded Pt particles (nm) | Loading amount of Pt particles (wt %) | R |
|---|---|---|---|---|---|---|---|---|---|
| 7 |  | ○ | ○ | 6 min | ○ | 2.1 | ±0.5 | 45 | 1.47 |
| 8 |  | ○ | ○ | 2 min | ○ | 2.2 | ±0.6 | 27 | 1.24 |
| 9 |  | ○ | ○ | 4 min | ○ | 2.0 | ±0.4 | 32 | 1.21 |
| 10 |  | ○ | ○ | 8 min | ○ | 2.2 | ±0.7 | 40 | 1.30 |
| 11 |  | ○ | ○ | 10 min | ○ | 4.5 | ±1.1 | 11 | 1.23 |

Figure 14:
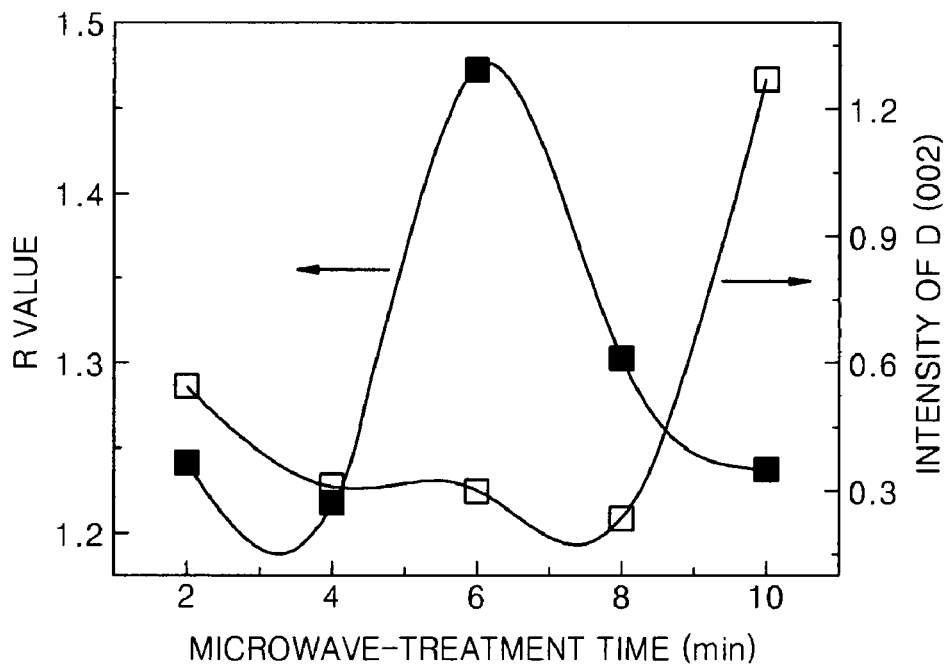
FIG. 14 is a graph illustrating R values and intensity of d (002) of a carbon nanotube with microwave-treating time.
Figure 15:
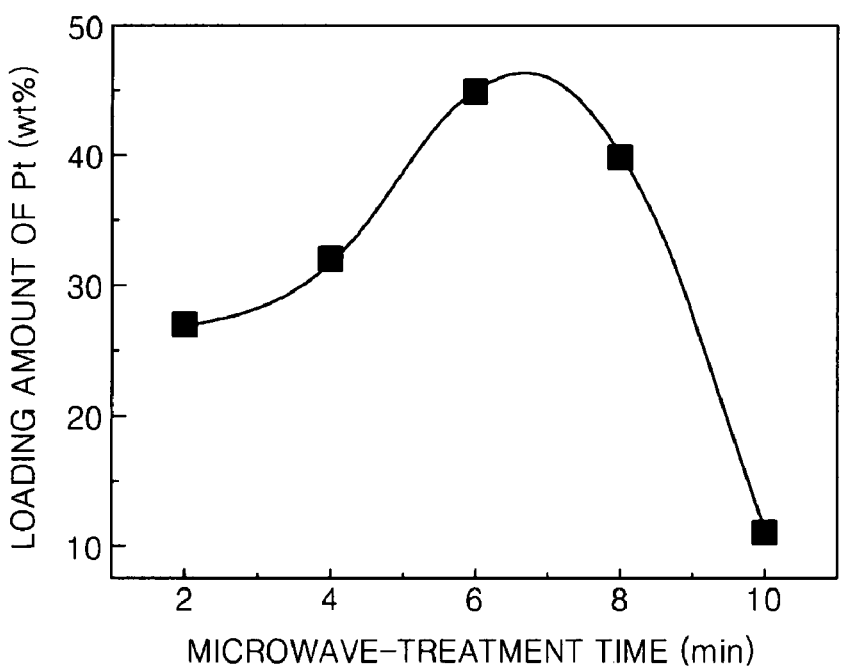
FIG. 15 is a graph illustrating the loaded amount of Pt particles with microwave-treating time.

Referring to the results of Samples 1 through 3, the defects have been most effectively induced by microwave-treatment compared to the acid-treatment and the oxidizer treatment. Referring to the results of Samples 4 and 5, when the carbon nanotubes are treated with an oxidizer and microwaves, the number of defects increased. Meanwhile, referring to the results of Samples 7 through 11, a preferred microwave-treatment time is about 6 minutes. When the microwave-treatment is preformed for longer than 8 minutes, the R value decreased and intensity of d(002) increased. It is believed that this is because the defects of the carbon nanotubes may recover due to a self-healing phenomenon, for example, by reforming a damaged carbon-carbon bond. The R values and intensity of d(002) of Samples 7 through 11 are shown in the graph of FIG. 14 where the x-axis represents the microwave-treatment time, and the loading amounts of Pt particles in Samples 7 through 11 are shown in the graph of FIG. 15.

The carbon nanotube according to an embodiment of the present invention has a high number of surface defects with an R value of at least 1.3. Accordingly, when the carbon nanotube is used as a support catalyst for fuel cells, a great number of catalyst particles can be loaded on the carbon nanotube, and the mean particle size and the variation in particle size of the loaded catalyst particles may decrease. A support catalyst according to an embodiment of the present invention can be prepared by microwave-treating the carbon nanotubes and/or using a nonionic dispersing agent. Thus, a support catalyst having excellent catalyst activity can be obtained. A fuel cell having improved performance can be obtained by using such a support catalyst.

While the present invention has been shown and described with reference to exemplary embodiments thereof, it will be understood by those of ordinary skill in the art that various changes in form and details may be made therein without departing from the spirit and scope of the present invention as defined by the following claims.

What is claimed is:

1. A fuel cell comprising a cathode, an anode and an electrolyte membrane between the cathode and the anode, wherein at least one of the cathode and the anode comprises a support catalyst comprising:
   carbon nanotubes having an integral value of a peak at $1360\pm80\,\text{cm}^{-1}$ characterizing a D band intensity ($I_D$) and an integral value of a peak at $1580\pm80\,\text{cm}^{-1}$ characterizing G band intensity ($I_G$) in the Raman spectrum such that the ratio of $I_D/I_G$, which is the R value, is at least 1.3; and
   catalyst particles loaded on the carbon nanotubes.

2. The fuel cell of claim 1, wherein an amount of the catalyst particles loaded on the carbon nanotubes is in the range of 10 to 45% wt % based on the weight of the support catalyst.

3. The fuel cell of claim 1, wherein a plurality of the catalyst particles are attached to defects on the surfaces of the carbon nanotubes.

4. The fuel cell of claim 1, wherein a mean particle size of the catalyst particles loaded on the carbon nanotubes is in the range of 2 to 5 nm.

5. The fuel cell of claim 1, wherein a variation in particle size of the catalyst particles loaded on the carbon nanotubes is in the range of ±0.4 to ±1.1 nm.

6. The fuel cell of claim 1, wherein the catalyst particles loaded on the carbon nanotubes comprise a metal selected from the group consisting of Ti, V, Cr, Mn, Fe, Co, Ni, Cu, Zn, Al, Mo, Se, Sn, Pt, Ru, Pd, W, Ir, Os, Rh, Nb, Ta, Pb, Bi, and combinations and alloys thereof.

* * * * *

UNITED STATES PATENT AND TRADEMARK OFFICE
CERTIFICATE OF CORRECTION

| | |
|---|---|
| PATENT NO. | : 8,017,282 B2 |
| APPLICATION NO. | : 11/897144 |
| DATED | : September 13, 2011 |
| INVENTOR(S) | : Jae-young Choi et al. |

It is certified that error appears in the above-identified patent and that said Letters Patent is hereby corrected as shown below:

In the Claims

Column 12, Claim 2, line 30.    Delete "45% wt %"
    Insert -- 45 wt% --

Signed and Sealed this
Thirty-first Day of July, 2012

David J. Kappos
*Director of the United States Patent and Trademark Office*